United States Patent [19]

Takagi

[11] Patent Number: 4,901,266

[45] Date of Patent: Feb. 13, 1990

[54] INTERPOLATING APPARATUS WITH A PROCESSING SECTION FOR LINE SEGMENTS PARALLEL WITH A COORDINATE AXIS

[75] Inventor: Toshiyuki Takagi, Hadano, Japan

[73] Assignee: Hitachi, Ltd., Tokyo, Japan

[21] Appl. No.: 224,075

[22] Filed: Jul. 25, 1988

[30] Foreign Application Priority Data

Aug. 25, 1987 [JP] Japan .................................. 62-209274

[51] Int. Cl.$^4$ ............................................... G06F 7/38
[52] U.S. Cl. .................................................... 364/723
[58] Field of Search ................... 364/513, 723, 413.18, 364/474.31; 318/573, 568.15

[56] References Cited

U.S. PATENT DOCUMENTS

| | | | |
|---|---|---|---|
| 3,748,447 | 7/1973 | Hajicek et al. | 364/723 |
| 4,313,173 | 1/1982 | Candy et al. | 364/723 |
| 4,402,012 | 8/1983 | Knight | 364/723 |
| 4,757,465 | 7/1988 | Hakoopian et al. | 364/723 |
| 4,829,587 | 5/1989 | Glazer et al. | 364/723 |

OTHER PUBLICATIONS

Harold L. Baeverstad, Jr., et al., "Display System Designed for Color Graphics", Hewlett–Packard Journal, Dec. 1980, pp. 25–31.

Primary Examiner—David L. Clark
Assistant Examiner—Dale M. Shaw
Attorney, Agent, or Firm—Fay, Sharpe, Beall, Fagan, Minnich & McKee

[57] ABSTRACT

In an interpolator for a line segment parallel with either X axis or Y axis, when a first comparator detects the coincidence of the X coordinate of the starting point with that of the terminating point, a counter is supplied with the Y coordinate of the starting point as an initial value, and counts up until its count value reaches the Y coordinate value of the terminating point. The successive count values from the counter are combined with the X coordinate of the starting point to produce a series of interpolating coordinates. When a second comparator detects the coincidence of the Y coordinate of the starting point with that of the terminating point, a similar counting is performed with respect to the X coordinate, and the count values are combined with the Y coordinate of the starting point. When both of the comparators fail to detect coincidence, a general purpose interpolator is started.

5 Claims, 4 Drawing Sheets

INTERPOLATING APPARATUS WITH A PROCESSING SECTION FOR LINE SEGMENTS PARALLEL WITH A COORDINATE AXIS

BACKGROUND OF THE INVENTION

The present invention relates to a line-figure processor, and more particularly to an apparatus which generates a dot pattern forming a line segment from the coordinates of the starting point and the terminating point of the line segment.

In conventional line-figure processors, a dot pattern for a line segment extending between a given starting point and a given terminating point is produced from the coordinates of these points by means of interpolation. A typical method of the interpolation is Bresenham's algorithm, a detail of which is disclosed in "Algorithm for Computer Control of a Digital Plotter" (Bresenham, J. E., IBM System Journal, vol. 4, No 1, pp. 25-30, (1965)).

The flow chart of FIG. 5 illustrates an outline of Bresenham's algorithm for 0 to 45 degrees of an angle between a given line segment and X axis. Let the coordinates of the starting and terminating points are $(X_o, Y_0)$ and $(X_a, Y_b)$, respectively. At the beginning, the differences in X and Y coordinates between the starting point and the terminating point, namely, $a=|X_a-X_0|$ and $b=|Y_b-Y_0|$, are calculated to supply a and b thereof to the first discriminant $e_1=2b-a$. Then, setting the value of K equal to 1, the coordinates of the first interpolating point $(X_1, Y_1)$ are calculated as indicated in the flow chart of FIG. 5. In this calculation, when $e_1>0$, a step 51 is selected and when $e_1<0$, a step 52 is selected. In case the step 51 is selected, the coordinates of the first interpolating point and the second discriminant to be used in the next calculation are $$(X_1, Y_1)=(X_0, Y_0+1)$$

$$e_2=e_1+2(b-a)=4b-3a$$

respectively, and in case the step 52 is selected, the corresponding values are $$(X_1, Y_1)=(X_0+1, Y_0)$$

$$e_2=e_1+2b=4b-a$$

respectively. The coordinates of successive interpolating points are calculated sequentially by repeating a similar calculation. In case the angle between the given line segment and X axis is out of 0 to 45 degree range, the generating of the dot pattern is essentially the same as aforementioned.

It can be pointed out as one of drawbacks of the conventional method described above that it inherently consumes rather a long processing time. However, the overall speed of line figure processing will be improved significantly if dot patterns for horizontal and vertical line segments, which appear very frequently in most practical cases, are generated more quickly.

SUMMARY OF THE INVENTION

An object of the present invention is to accelerate the generation of a dot pattern for a line segment parallel with a coordinate axis, such as a vertical or a horizontal line segment, thereby improving the overall speed of a line-figure processor.

The line-figure processor of the present invention comprises a comparator which compares values of a first coordinate component (X coordinate component, for instance) of starting point coordinates and terminating point coordinates, a data modifying circuit which is started when the first coordinate component values coincide with each other and recursively modifies a value of a second oordinate component (Y coordinate component, for instance) of the starting point coordinates by a unit value ("1", for instance) up to a value of the second coordinate component of the terminating point coordinates, a coordinates producing circuit which produces interpolating coordinates data by combining one of the first coordinate component values with the successive values obtained from the data modifying circuit, and a general-purpose interpolator to be started in case the first coordinate components are not equal to each other.

If a specified line segment is parallel with one of the coordinate axis (vertical, for instance), the first coordinate component values of both the starting point and the terminating point must coincide with each other. When the comparator detects the coincidence, the data modifying circuits starts to modify the value of the other coordinate component (Y coordinate, for instance) by the unit value recursively up to the terminating point value. Consequently, a series of coordinate component values (for instance, $Y_0, Y_0+1, \ldots, Y_b$) from the starting point to the terminating point are sequentially produced along the corresponding axis. These coordinate component values are combined with one of the coordinate component values which were detected to be coincident with each other to form a series of coordinates (for instance, $(X_0, Y_0), (X_0, Y_0+1), \ldots, (X_o, Y_b)$ in which one of the component remains at a constant value while the other component changes its value by the unit value. Thus, the positions of successive dots forming a line segment extending from the starting point to the terminating point in parallel with a coordinate axis (a vertical line segment, for instance) are defined by the series of coordinates described above.

The above-described processing is very simple and requires a much shorter time than the conventional general purpose interpolation, such as the Bresenham's algorithm, and only the line segments not parallel with either coordinate axis are processed by such a general-purpose interpolation. As a result, the dot patterns for the vertical and horizontal line segments which are prevailing in the practical line-figures, are produced at a remarkably faster speed, and therefore the overall processing time of the line-figure processor is improved significantly.

Other objects, features and advantages of this invention will become apparent from the following detailed description in conjunction with the accompanying drawings.

DETAILED DESCRIPTION OF THE PREFERRED EMBODIMENT

Figure 1:
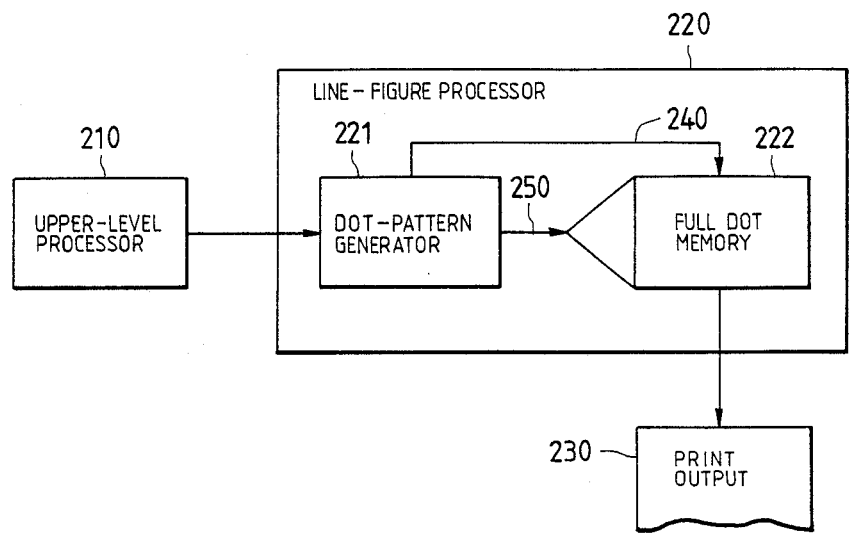
FIG. 1 is a block depicting a line-figure processor including an interpolating apparatus embodying the present invention.

FIG. 1 depicts an outline of a line-figure processing system including an embodiment of this invention. An upper-level processor 210 supplies a series of coordinates data which define a line figure which should be outputted to a line-figure processor 220. A dot pattern generator 221 in the line-figure processor 220 calculates the value 240 of each dot and the address 250 thereof from the coordinates data, and stores the calculated value of each dot in a corresponding storage location in a full dot memory 222. The full dot memory 222 has a plurality of storage locations corresponding respectively to all the dot positions on the output page. The contents of these storage locations are read out to an output equipment 230 (printer, display, etc.) sequentially in synchronism with the scanning therein. Alternatively, the output of the dot pattern generator 221 may be supplied to a plotter via an appropriate buffer, if desired.

Figure 2:
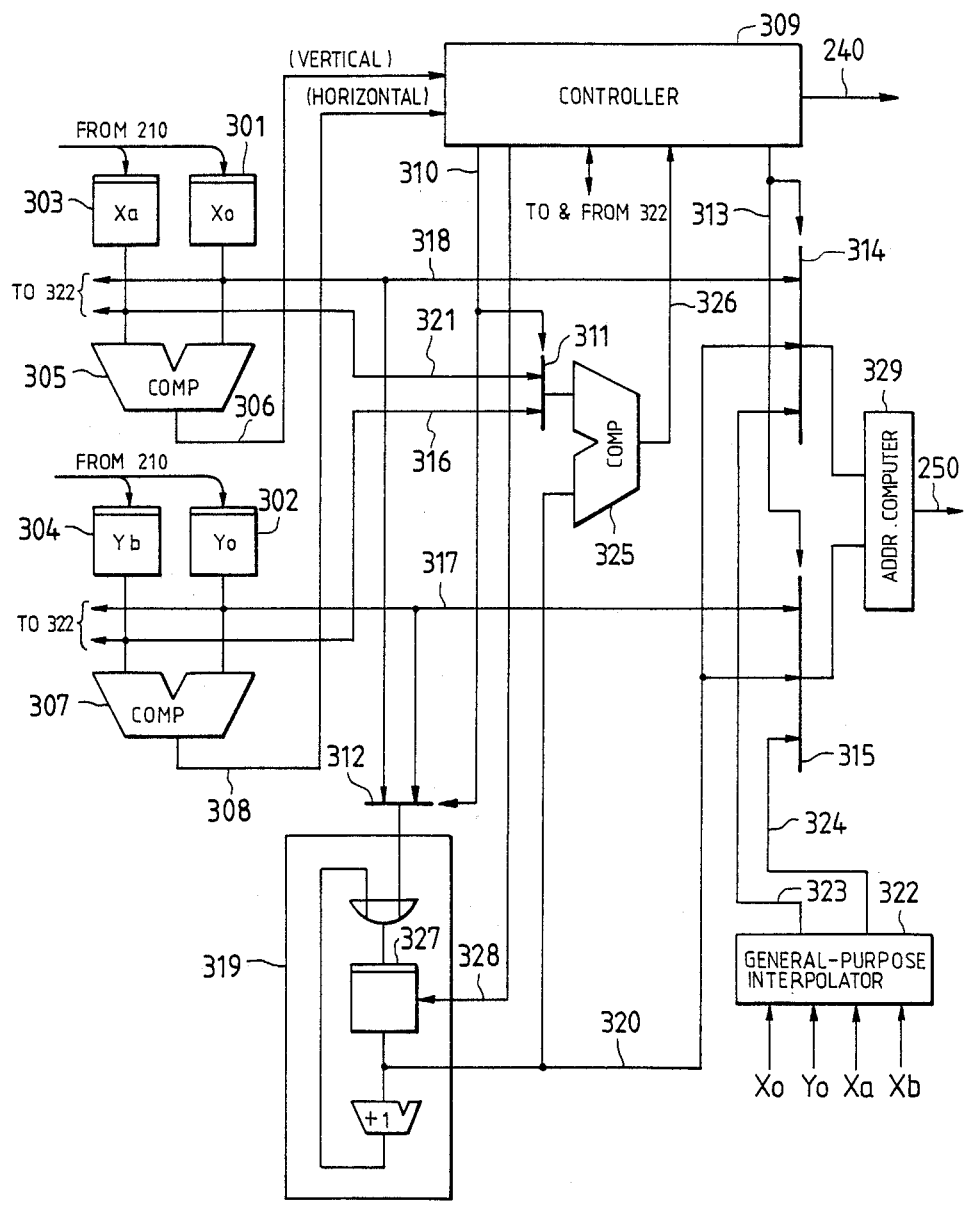
FIG. 2 is a block diagram of a dot pattern generator including an interpolating apparatus embodying the present invention.

FIG. 2 shows the dot pattern generator 221 with an interpolating apparatus which embodies the present invention. The coordinates data of a starting point $X_0$, $Y_0$ and of a terminating point $X_a$, $Y_b$ supplied by the upperlevel processor 210 are stored in a starting point X coordinate registers 301, a starting point Y coordinate register 302, a terminating point X coordinate register 303, and a terminating point Y coordinate register 304, respectively. An X coordinate comparator 305 compares $X_0$ with $X_a$, and produces an X coordinate coincidence signal 306 when $X_0$ equals $X_a$. Similarly, a Y coordinate comparator 307 compares $Y_0$ with $Y_b$, and produces a Y coordinate coincidence signal 308 when $Y_0$ equals $Y_b$. The signal 306 implies that a vertical line segment is specified, and the signal 308 implies that a horizontal line segment is specified.

A controller 309 operates in response to the X coordinate coincidence signal 307 and the Y coordinate coincidence signal 308, and controls selectors 311 and 312 by means of a selection signal 310 and also controls selectors 314 and 315 by means of a selection signal 313. In case the X coordinate coincidence signal 306 is produced, that is, the line segment is vertical, the selectors are controlled so that the selector 311 selects terminating point Y coordinate data 316, the selector 312 selects starting point Y coordinate data 317, the selector 314 selects starting point X coordinate data 318, and the selector 315 selects an output 320 of a coordinate counter 319. On the other hand, in case the Y coordinate coincidence signal 308 is produced, that is, the line segment is horizontal, the selector 311 selects terminating point X coordinate data 321, the selector 312 selects the staring point X coordinate data 318, the selector 314 selects the output 320 of the coordinate counter 319, and the selector 315 selects the starting point Y coordinate data 317. In case neither the X coordinate coincidence signal 306 nor the Y coordinate coincidence signal 308 is produced, the controller 309 suppresses the selectors 311 and 312 and starts a general-purpose interpolator 322. At the same time, the controller 309 controls the selectors 314 and 315 to select an X coordinate output 323 and a Y coordinate output 324, respectively, from the general-purpose interpolator 322. The general purpose interpolator 322 may be a conventional interpolator adopting, for example, the Bresenham's algorithm mentioned previously.

A comparator 325 compares either the terminating point X coordinate data 321 or the terminating point Y coordinate data 316 as selected by the selector 311 with the output 320 of the coordinate counter 319, and sends a coincidence signal 326 to the controller 309 in case the coincidence thereof is obtained. The counter 319 receives in a register 327 either the starting point X coordinate data 318 or the starting point Y coordinate data 317 as selected by the selector 312, and counts up the data in the register 327 in synchronism with a count-up signal train 328 from the controller 309. An address computer 329 receives the X coordinate data via the selecter 314 and the Y coordinate data via the selector 315, and computes the address 250 of a storage location corresponding thereto in the full dot memory 222 (FIG. 1). The relation between the coordinates and the addresses in the full dot memory 222 is determined previously. The dot value data 240 is supplied to the full dot memory 222 from the controller 309 in synchronism with the outputting of the address 250 from the address computer 329.

Figure 3:
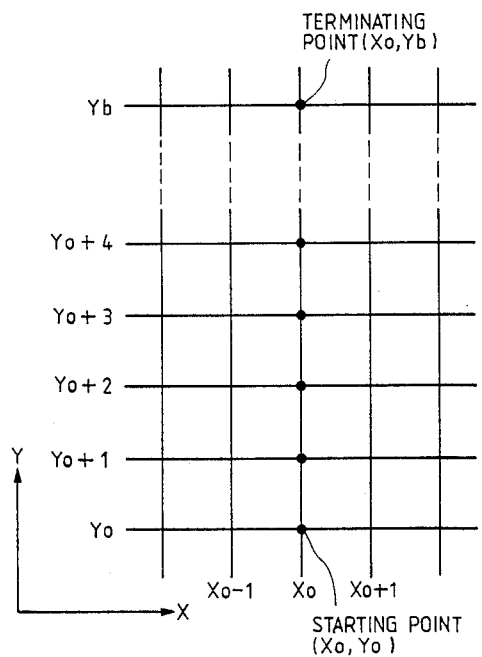
FIG. 3 illustrates an example of the dot pattern for a vertical line segment produced by the interpolating apparatus shown in FIG. 2.

The operation of the circuit illustrated in FIG. 2 in case coordinate data specifying a vertical line segment is supplied from the upper level processor 210 will be explained hereinafter with reference to FIG. 3 which illustrates the dot pattern to be generated in this case. When the line segment is vertical, the X coordinate comparator 305 produces the X coordinate coincidence signal 306 as $X_a$ is equal to $X_0$. Responding to the signal 306, the controller 309 selects the terminating point Y coordinate data 316 ($Y_b$) via the selector 311, the starting point Y coordinate data 317 ($Y_0$) via the selector 312, the starting point X coordinate data 318 ($X_0$) via the selector 314, and the output 320 of the coordinate counter 319 via the selector 315. $Y_0$ selected by the selector 312 is stored in the register 327 of the coordinate counter 319. So the counter output 320 is $Y_0$ at this instant. The address computer 329 calculates a full dot memory address. corresponding to the coordinates ($X_0$, $Y_0$) using the starting point X coordinate data $X_0$ via the selector 314 and the counter output $Y_0$ via the selector 315, and sends the address signal 250 to the full dot memory 222. At the same time, the controller 309 sends value "1" as the dot value data 240 to the full dot memory 222. As a result, "1" is written in a location o the full dot memory which corresponds to the coordinates ($X_0$, $Y_0$).

In the next step, the controller 309 supplies the counter up signal 328 to the counter 329 to increase the content of the register 327 to $Y_0+1$. The address computer 329 produces the address 250 corresponding to the coordinates ($X_0$, $Y_0+1$) this time, and the controller 309 produces "1" again as the dot value data 240. Consequently, "1" is written in a location corresponding to the coordinates ($X_0$, $Y_0+1$) in the full dot memory.

In like manner, "1"'s are written in the full dot memory locations corresponding to a series of coordinates ($X_0$, $Y_0+2$), ($X_0$, $Y_0+3$), . . . , ($X_0$, $Y_b$), respectively, in which only the Y coordinate component is increasing. When the content of the coordinate counter 309 reaches $Y_b$, the comparator 325 produces the coincidence signal 326, and the controller 309 completes the dot pattern generation for this particular line segment.

In case the line segment is horizontal, the Y coordinate comparator 307 produces the Y coordinate coincidence signal 308, and the selectors 311, 312, 314 and 315 change their selections. The coordinate counter 319 counts up the starting point X coordinate data $X_0$ until value $X_a$ is reached. Using the successive output data thereof and the Y coordinate data $Y_o$, a series of coordinates $(X_0, Y_0), (X_0+1, Y_0), \ldots, (X_a, Y_0)$ with only the X coordinate value increasing are produced and "1"'s are written in the corresponding locations in the full dot memory 222.

For the embodiment described hereinbefore it is assumed that the condition $Y_o < Y_b$ is always satisfied for vertical line segments and $X_0 < X_a$ for horizontal line segments. If inversely, the condition $Y_o > Y_b$ is satisfied for vertical line segments and $X_0 > X_a$ for horizontal line segments, the coordinate counter must be changed to a down counter. For the general case where none of these conditions are satisfied, an up-down or reversible counter is adopted as the coordinate counter 319 as illustrated in FIG. 4, and the controller 309 is so arranged as to examine, when one (e.g., 305) of the coordinate comparators detects coincidence, the larger/smaller relation indicated by the other coordinate comparator (e.g., 307), and to decide the counting direction of the up-down counter depending on the relation indicated by the latter comparator.

Figure 4:
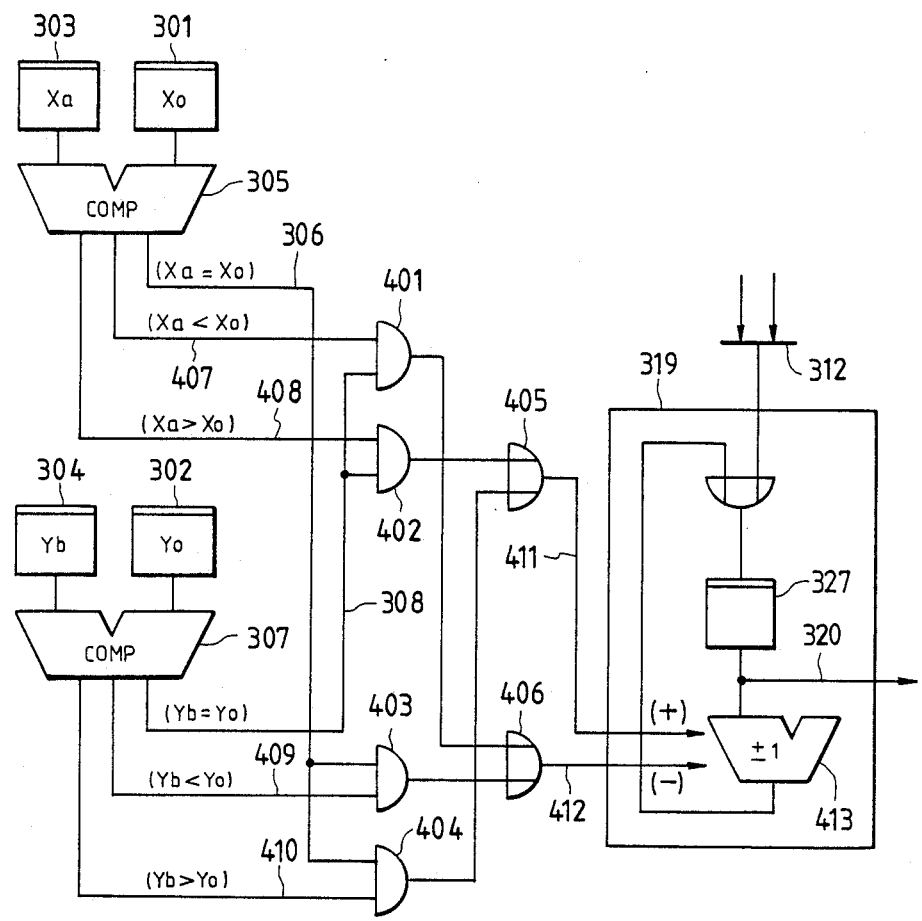
FIG. 4 is a circuit diagram of a logic circuit to control the direction of counting used in another embodiment of the present invention.
Figure 5:
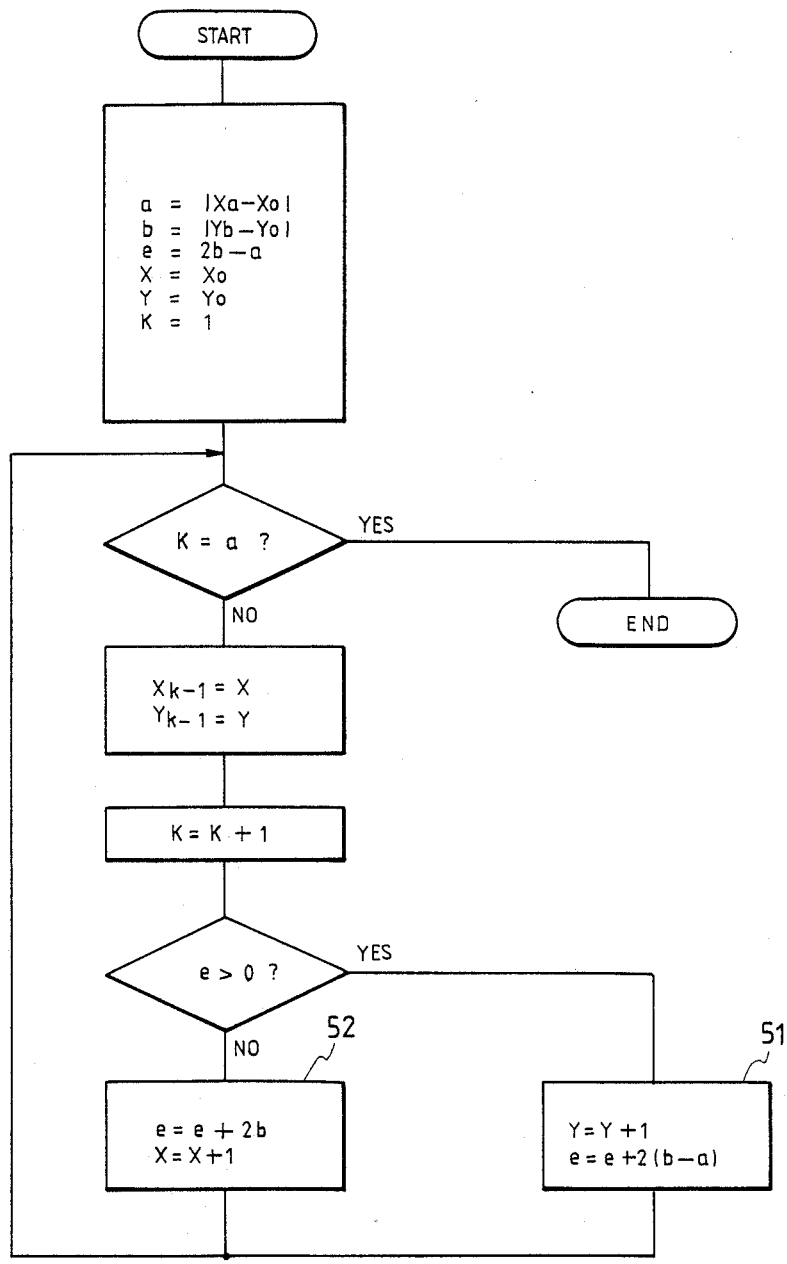
FIG. 5 is a flow chart to show an outline of the Bresenham's algorithm as a prior art.

As shown in FIG. 4, and AND gate 404 combines conjunctively the "$X_a=X_0$" output 306 of the comparator 305 and a "$Y_b>Y_0$" output 410 of the comparator 307, and an AND gate 402 combines conjunctively the "$Y_b=Y_0$" output 308 of the comparator 307 and a "$X_a>X_0$" output 408 of the comparator 305. An OR gate 405 produces a count up signal 411 by combining disjunctively the outputs of the AND gates 402 and 404. On the other hand, an AND gate 403 combines conjunctively a "$X_a=X_0$" output 306 of the comparator 305 and a "$Y_b<Y_0$" output 409 of the comparator 307, and an AND gate 401 combines conjuntively the "$Y_b=Y_o$" output 308 of the comparator 307 and a "$X_a<X_0$" output 407 of the comparator 305. An OR gate 406 produces a count down signal 412 by combining disjunctively the outputs of the AND gates 401 and 403. The signals 411 and 412 control an incrementer/decrementer 413 in the up-down counter 319 to effect counting-up and counting-down, respectively.

In another modification, since all vertical line segments assure $X_a=X_0$, the interpolating coordinates for the vertical line segment can be obtained by combining $X_a$ instead of $X_0$ with the output 320 of the counter 319. Similarly, since all horizontal line segments assure $Y_b=Y_0$, the interpolating coordinates for the horizontal line segment can be obtained by combining $Y_b$ instead of $Y_0$ with the output 320 of the counter 319. Therefore, the $X_a$ data 321 and the $Y_b$ data 316 can be introduced instead of the $X_0$ data 318 and the $Y_0$ data 317, to the selector 314 and 315, respectively.

What is claimed is:

1. In a line-figure processing system, an interpolating apparatus for producing from data of starting point coordinates and terminating point coordinates on a two-dimensional coordinates system a dot pattern for a line segment extending between two points corresponding respectively to said starting point coordinates and said terminating point coordinates, comprising:
   comparing means for comparing a value of a first coordinate component of said starting point coordinates with a value of a first coordinate component of said terminating point coordinates;
   data modifying means started in response to detection by said comparing means of coincidence of said first coordinate component values for recursively modifying a value of a second coordinate component of said starting point coordinates by a unit value up to a value of a second coordinate component of said terminating point coordinates;
   means for combining one of said first coordinate component values and a series of values obtained from said data modifying means to produce a series of interpolating coordinates data; and
   general-purpose interpolating means started in response to detection by said comparing means of noncoincidence of said first coordinate component values.

2. The interpolating apparatus according to claim 1, wherein said data modifying means comprises counting means, means for supplying the second coordinate component value of said starting point coordinates as an initial value to said counting means, and means for comparing a count value of said counting means with the second coordinate component value of said terminating point coordinates.

3. In a line-figure processing system, an interpolating apparatus for producing from data of starting point coordinates and terminating point coordinates on a two-dimensional coordinates system a dot pattern for a line segment extending between two points corresponding respectively to said starting point coordinates and said terminating point coordinates, comprising:
   first comparing means for comparing a value of a first coordinate component of said starting point coordinates with a value of a first coordinate component of said terminating point coordinates;
   second comparing means for comparing a value of a second coordinate component of said starting point coordinates with a value of a second coordinate component of said terminating point coordinates;
   data modifying means for recursively modifying a value of first data up to a value of second data by a unit value;
   coordinates data producing means for producing a series of interpolating coordinates data by combining a value of third data and a series of values obtained from said data modifying means;
   selectively supplying means for supplying, when said first comparing means detects coincidence of said first coordinate component values, the second coordinate component value of said starting point coordinates and the second coordinate component value of said terminating point coordinates to said data modifying means as said first data and said second data, respectively, and one of said first coordinate component values to said coordinates data producing means as said third data, and supplying, when said second comparing means detects coincidence of said second coordinate component values, the first coordinate component value of said starting point coordinates and the first coordinate component value of said terminating point coordinates to said data modifying means as said first data and said second data, respectively, and one of said second component values to said coordinates data producing means as said third data; and general purpose interpolating means to be started when neither said first comparing means nor said second comparing means detects any coincidence.

4. The interpolating apparatus according to claim 3, wherein said data modifying means comprises counting means, means for supplying said first data to said counting means as an initial value, and a third comparing means for comparing a count value of said counting means with said second data.

5. The interpolating apparatus according to claim 4, wherein said counting means is up-down counting means, and said data modifying means further comprises means responsive to comparison result outputs of said first and second comparing means for controlling counting direction of said up-down counting means.

* * * * *